(12) United States Patent
Parsons

(10) Patent No.: US 11,058,094 B2
(45) Date of Patent: Jul. 13, 2021

(54) INJURY MITIGATING STOCK GUARD

(71) Applicant: Joseph C. Parsons, Marana, AZ (US)

(72) Inventor: Joseph C. Parsons, Marana, AZ (US)

( * ) Notice: Subject to any disclaimer, the term of this patent is extended or adjusted under 35 U.S.C. 154(b) by 520 days.

(21) Appl. No.: 15/683,474

(22) Filed: Aug. 22, 2017

(65) Prior Publication Data

US 2017/0347623 A1    Dec. 7, 2017

Related U.S. Application Data

(63) Continuation of application No. 14/249,522, filed on Apr. 10, 2014, now Pat. No. 9,750,228.

(51) Int. Cl.
*A01K 3/00* (2006.01)

(52) U.S. Cl.
CPC .................... *A01K 3/002* (2013.01)

(58) Field of Classification Search
CPC ........ A01K 1/015; A01K 1/0151; A01K 3/00; A01K 3/002; E04H 17/00; E06B 11/00; E06B 11/02; E06B 11/022; G01G 17/08
USPC ...... 256/14–18, 73; 119/511, 512, 529, 530; 49/58, 131
See application file for complete search history.

(56) References Cited

U.S. PATENT DOCUMENTS

| | | | | |
|---|---|---|---|---|
| 1,596,898 A * | 8/1926 | Irma | ...................... | E01B 17/00 256/14 |
| 2,750,157 A * | 6/1956 | Alsburg | ................. | A01K 3/002 256/17 |
| 2,899,174 A * | 8/1959 | Wells | ...................... | A01K 3/002 256/14 |
| 2,938,711 A * | 5/1960 | Luff | ........................ | A01K 3/002 256/17 |
| 3,322,399 A * | 5/1967 | Sawyers | ................ | A01K 3/002 256/17 |
| 3,455,279 A * | 7/1969 | Krevit | .................. | A01K 1/0151 119/529 |
| 3,457,901 A * | 7/1969 | Abraham | ............. | A01K 1/0151 119/530 |
| 3,491,480 A * | 1/1970 | Nickel | .................. | A01K 3/002 49/131 |
| 3,491,482 A * | 1/1970 | Wedekind | ............. | A01K 3/002 49/131 |
| 3,730,140 A * | 5/1973 | Bowser | ................ | A01K 1/0151 119/529 |
| 3,790,135 A * | 2/1974 | Christianson | .......... | A01K 3/002 256/17 |
| 4,163,545 A * | 8/1979 | Ostermiller | ............ | A01K 3/002 256/17 |
| 4,387,882 A * | 6/1983 | Mansour | ................ | A01K 3/002 256/17 |

(Continued)

FOREIGN PATENT DOCUMENTS

| | | | | |
|---|---|---|---|---|
| DE | 1509007 A1 * | 6/1969 | ........... | A01K 1/0151 |
| GB | 764528 A * | 12/1956 | ............. | A01K 3/002 |
| GB | 1497861 A * | 1/1978 | ............. | A01K 3/002 |

*Primary Examiner* — Josh Skroupa
(74) *Attorney, Agent, or Firm* — Quarles & Brady LLP

(57) ABSTRACT

An injury mitigating stock guard includes mutually parallel linear members defining linear pockets therebetween of sufficient size to allow the passage of the hoof of an adult domesticated animal. The linear members include one or more laterally extending flanges that prevent the further passage of the hoof through the bottoms of the pockets to prevent injury.

15 Claims, 4 Drawing Sheets

(56) References Cited

U.S. PATENT DOCUMENTS

| | | | | | |
|---|---|---|---|---|---|
| 4,789,137 | A | * | 12/1988 | Heldenbrand | A01K 3/002 256/14 |
| 4,844,423 | A | * | 7/1989 | Combs | A01K 3/002 254/17 |
| 5,131,631 | A | * | 7/1992 | Cobbe | A01K 3/002 256/14 |
| 5,179,801 | A | * | 1/1993 | Babchuk | A01K 3/002 256/14 |
| 5,419,537 | A | * | 5/1995 | Thompson | A01K 3/002 256/14 |
| 8,070,901 | B2 | * | 12/2011 | Petersson | B29C 70/342 156/214 |
| 2011/0133144 | A1 | * | 6/2011 | Miller | A01K 3/002 256/17 |
| 2013/0221305 | A1 | * | 8/2013 | Dilworth | A01K 3/002 256/73 |

\* cited by examiner

INJURY MITIGATING STOCK GUARD

CROSS REFERENCE TO RELATED APPLICATION

This application is a continuation of U.S. patent application Ser. No. 14/249,522, filed on Apr. 10, 2014, the disclosure of which is incorporated herein in its entirety.

FIELD OF THE INVENTION

The invention relates to stock guards, which deter the passage of livestock while enabling the passage of wheeled vehicles, and in particular, to stock guards that mitigate the potential for injury to animals.

BACKGROUND OF THE INVENTION

Cattle guards or stock guards have long been known. A cattle guard is a device that impedes or deters the passage of livestock, while enabling the passage of vehicles. Cattle guards are typically located where fence lines cross roads, and allow for stock to be confined to defined ranges without the necessity of locating a gate where a roadway crosses a fence line.

Conventionally, cattle guards are provided as an array of mutually parallel spaced apart linear members arranged transverse to the direction of traffic flow. The spacing between the members is chosen to define inter-member spaces that exceed the maximum dimension of the hoof of an animal. Conventionally, this array of mutually parallel spaced apart linear members is placed above an excavation or vault, which defines a space below the local grade level. An animal, typically a cow, upon encountering a cattle guard, will refuse to cross for fear of placing its hoof into the deep hole defined by the inter-member spacing and the ditch below.

Conventionally, cattle guards are formed of linear members having rectangular or triangular cross section, typically fabricated from tubular steel. These linear members are affixed to a plurality of cross members, which themselves are mutually parallel, and which are bolted or set upon a ledge defined by the concrete structure that defines the vault or ditch. For certain conventional cattle guards, triangular or rectangular wings are provided at either end of the linear member array, which bridge the distance between the cattle guard and nearby fence posts. In certain conventional designs, these wings may be hinged.

Conventional cattle guards have a variety of disadvantages. While effective for domesticated cattle, stock guards will oftentimes not deter other kinds of animals. In particular, bison and horses, of both the domesticated and wild varieties, are oftentimes not deterred by conventional stock guards. Additionally, some cattle will still attempt to cross conventional stock guards. Because, the spaces between adjacent linear members in conventional stock guards exceeds the size of an animal's hoof, when an animal attempts to cross a conventional stock guard, injury, typically a broken leg, and death is often the result. Additionally, injury can result when an animal does not notice that the conventional cattle guard is there, for example, when it is hidden by brush, snow or other debris.

Methods have been suggested to provide a safer alternative to conventional stock guards. The "universal cattle guard" available from Outlaw Industrial, LLC of Globe Arizona (http://www.cattleguard.info/faq.html), uses a plurality of mutually parallel spaced about members having a circular cross section, which is placed at grade, i.e., not above an excavated ditch or vault. While the "universal cattle guard" appears to prevent animal injury, its effectiveness as an animal deterrent is suspect for a variety of reasons. For example, because of its open design, debris may accumulate between the tubular members from the bottom (e.g., as a result of water running past the structure), thereby filling up the voids between the adjacent tubular members. Additionally, even when this device is clear of debris, animals can see the natural surface of the ground between the tubular members, which decreases the device's effectiveness.

What is needed is a stock guard that prevents injury, but that is as effective as a deterrent as conventional stock guards.

SUMMARY OF THE INVENTION

Embodiments of the invention are directed to an injury-reducing stock guard including a plurality of mutually parallel, spaced-apart linear members. Each member has a top side, the plurality of which define a top surface of the stock guard which is substantially parallel to grade over which a vehicle may travel. Each member also includes at least one laterally extending flange disposed in a plane parallel to and below the aforementioned top surface. The at least one laterally extending flange forms a bottom surface which defines the bottom extent of a pocket also defined by two adjacent linear members. The at least one laterally extending wing also defines a slot in the bottom surface which is sized such that the hoof of an animal cannot pass through, but which does allow the passage of water and debris.

In another embodiment, each linear member has a hat-like cross section with a rectangular center portion and two laterally extending flanges on either side of the rectangular center portion, such that adjacent linear members together define a pocket, and the mutually facing flanges of adjacent members define a slot therebetween sized such that the hoof of an animal cannot pass through. In certain embodiments, the pocket is painted a dark color, which contrasts with the top surface of the stock guard defined by the top surfaces of the hat-like linear members.

In certain embodiments, the stock guard according to the present invention is arranged over a ditch or vault, such that debris and the like can sluice through the slots at the bottoms of the pockets. In other embodiments, the stock guard is placed at or near grade, without a ditch or vault. In these embodiments, the stock guard may optionally include a first and second transition sections that extend in the direction of the expected direction of travel, which are inclined toward grade from a central section having a top surface parallel to grade. The result of this arrangement is to provide inclined transition zones for vehicles driving onto and off of the stock guard.

Stock guards according to embodiments of the invention have certain advantages. For example, stock guards according to embodiments of the invention mitigate the possibility of injury because they prevent an animal's hoof from penetrating or extending through the bottom of the stock guard. This enables stock guards according to embodiments of the invention to used for animals other than cows (e.g., mustangs, bison, etc.), which can be expected to "test" a stock guard. At the same time, the pockets defined by adjacent linear members create sufficient shadowing and abrupt vertical transitions to deter most animals from crossing.

These and other features, aspects, and advantages of the present invention will become better understood upon consideration of the following detailed description and drawings.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
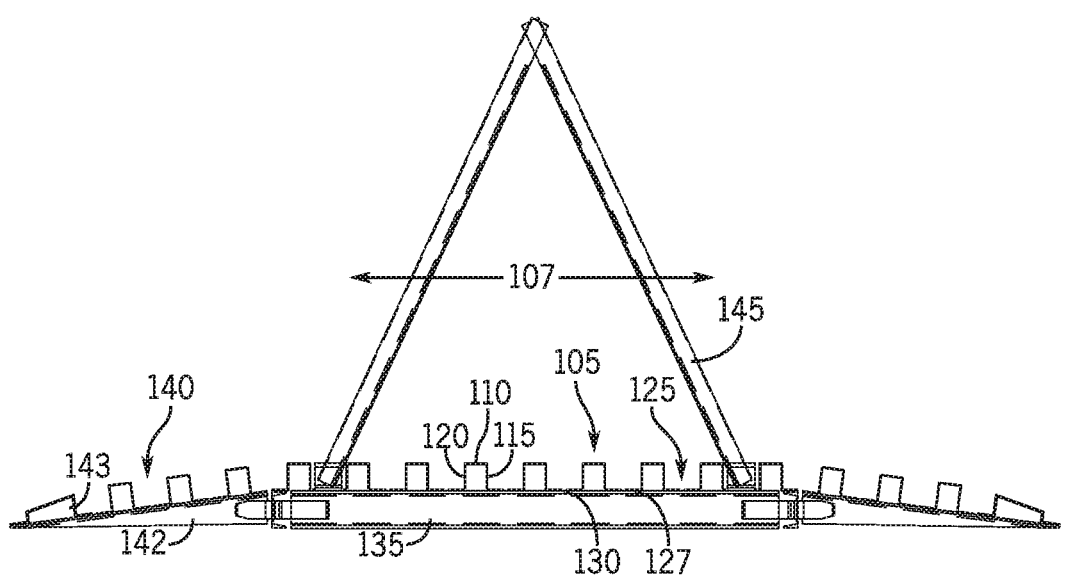
FIG. 1 shows a cross section of a stock guard according to an embodiment of the invention.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention is described in preferred embodiments in the following description with reference to the Figures, in which like numbers represent the same or similar elements.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 shows a cross section of a stock guard according to an embodiment of the invention. The stock guard of FIG. 1 includes a plurality of spaced apart, mutually parallel linear members 105. Linear members 105 are arranged in a horizontal plane to support the passage of vehicles over the top of the plurality of linear members along the indicated direction of travel 107. The linear members themselves are arranged with their long axes transverse to the direction of travel 107.

Each linear member 105 has a central portion having a substantially rectangular cross section, with a top surface 110 and a first and second side surfaces 115, 120, which are substantially vertical. Collectively, the top surfaces 110 of the linear members define a plane such supports a wheeled vehicle.

Adjacent pairs of linear members 105 define linear pockets 125 bounded in the horizontal direction by first vertical surface of a first linear member and the facing second vertical surface of an adjacent linear member. These pockets are sized (in the horizontal direction) such that the hoof of an animal (e.g., a cow, horse, bison, etc.) can pass below an upper plane containing top surfaces 110 into the pocket. In one embodiment, the inter-member spacing between adjacent linear members, which defines the width of the linear pocket is 4 inches. An exemplary range for widths of the pockets is between 2.5 and 5 inches. Additionally, the top surface 110 of each linear member is sufficiently narrow, again along direction 107, to prevent a hoof of an animal from comfortably balancing on surface 110. In one embodiment, the width of top surface 110 is 2.5 inches. An exemplary range for the width of the top surface of the linear members is between 2 and 3 inches. Thus, an animal encountering the stock guard of FIG. 1 will be deterred from stepping onto the guard for gear that its hoof will fall below the plane defined by the collection of top surfaces 110.

In the event that an animal is not deterred, and steps into a pocket 125, the stock guard of FIG. 1 is designed to capture the hoof of the animal, thereby preventing serious injury. This is accomplished by the provision of one or more laterally extending flanges 127 that extend from the vertical sides 115, 120 of linear members 105. Flanges 127 and linear members 105 define a linear slot 130, which in the embodiment of FIG. 1, runs the length of the adjacent linear members. One purpose and advantage of slot 130 is to allow water and debris to sluice out of the pockets 125. In the embodiment of FIG. 1, each linear member 105 has two flanges that extend in the horizontal plane to either side of the central portion, resulting in a "hat-shaped" cross section for each linear member 105. For these configurations, flanges 127 are disposed in a lower plane that is parallel to and below the place defined by a plurality of top surfaces 110. This configuration, however, is exemplary and not required. Alternative exemplary embodiments may be provided in which there is only a single flange per pocket. Additionally, flanges that are not co-planar, and are not parallel to the top surfaces 110 of the linear members are possible, and within the scope of the invention. Additionally, "L"-shaped linear members, and linear members having triangular, circular or other cross sectional profiles for the central portion are all acceptable. All that is necessary is that some safe obstruction is provided that prevents the passage of a hoof through the bottom of pockets 125.

It will be appreciated that the vertical depth of the pockets 125 impacts whether an animal is likely to be deterred. In one embodiment, the vertical depth between top surface 110 and flange 127 (i.e., the depth of pocket 125) is 3 inches. An exemplary range for this dimension is between 2 and 4 inches. In particular, the depth of pockets 125 should be sufficient to prevent an animal from putting part of its hoof (e.g., a heel portion), on a top surface of the linear member, while putting another part of the same hoof (e.g., a toe portion) on a flange at the bottom of the pocket 125. This would allow the animal to feel secure in its footing, and is disadvantageous from a deterrence standpoint. Additionally, Applicants have discovered that the use of sharp angles to form the transition between the top surface 110 of the linear members and the pocket 125 is particularly effective at deterring livestock form placing their hooves into the pocket. Additionally, Applicant has discovered that by enhancing the visible contrast between top surface 110 and the pocket 125, for example, by painting the interior of pocket 125 with a dark color (e.g., black) and/or painting top surface 110 with a light color (e.g., white or bright yellow), this contrast can be enhanced. These advantageous embodiments, however, are not limiting and are not required by the invention.

In the embodiment of FIG. 1, linear members 105 are affixed to and above a plurality of spaced apart, mutually parallel support members 135. In certain embodiments, the stock guard of FIG. 1 is installed at grade, with support members 135 resting on the ground. In these embodiments, support members 135 define a vertical space of offset which serves to life the array of linear members 105 off the ground by at least the height of the support members 135. This has two advantages. First, Applicants have observed that by "floating" the linear members 105 above the ground on the support members 135, the linear members will rattle in a noisy fashion when the stock guard is stepped on by cattle. This rattle provides additional deterrence to the passage of stock. Second, by providing a space underneath the bottoms of the pockets 125 defined by linear members 105, art area is provided into which debris can be washed. This prevents debris from accumulating in the pockets 125, which prevents stock from seeing a surface that looks like the natural surface of the ground, which again enhances deterrence.

The stock guard of FIG. 1 further includes transition regions 140, characterized by tapered support members, which support additional linear members such that the top surfaces of these linear members are inclined at an angle toward the ground. The purpose of transition region 140 is to ease the transition of a wheeled vehicle as it transitions from grade onto the stock guard. In certain embodiments, one linear member 143 is provided at the end of the transition region which is triangular or trapezoidal in cross section.

The stock guard of FIG. 1 further includes triangular wing sections 145 arranged at the ends of linear members 105. Triangular wing sections 145 are optionally hinged or otherwise rotatable about an axis parallel to direction 107 so that they may be deployed outwardly to bridge any gap between the stock guard and a fence line into which the stock guard is installed.

Figure 2:
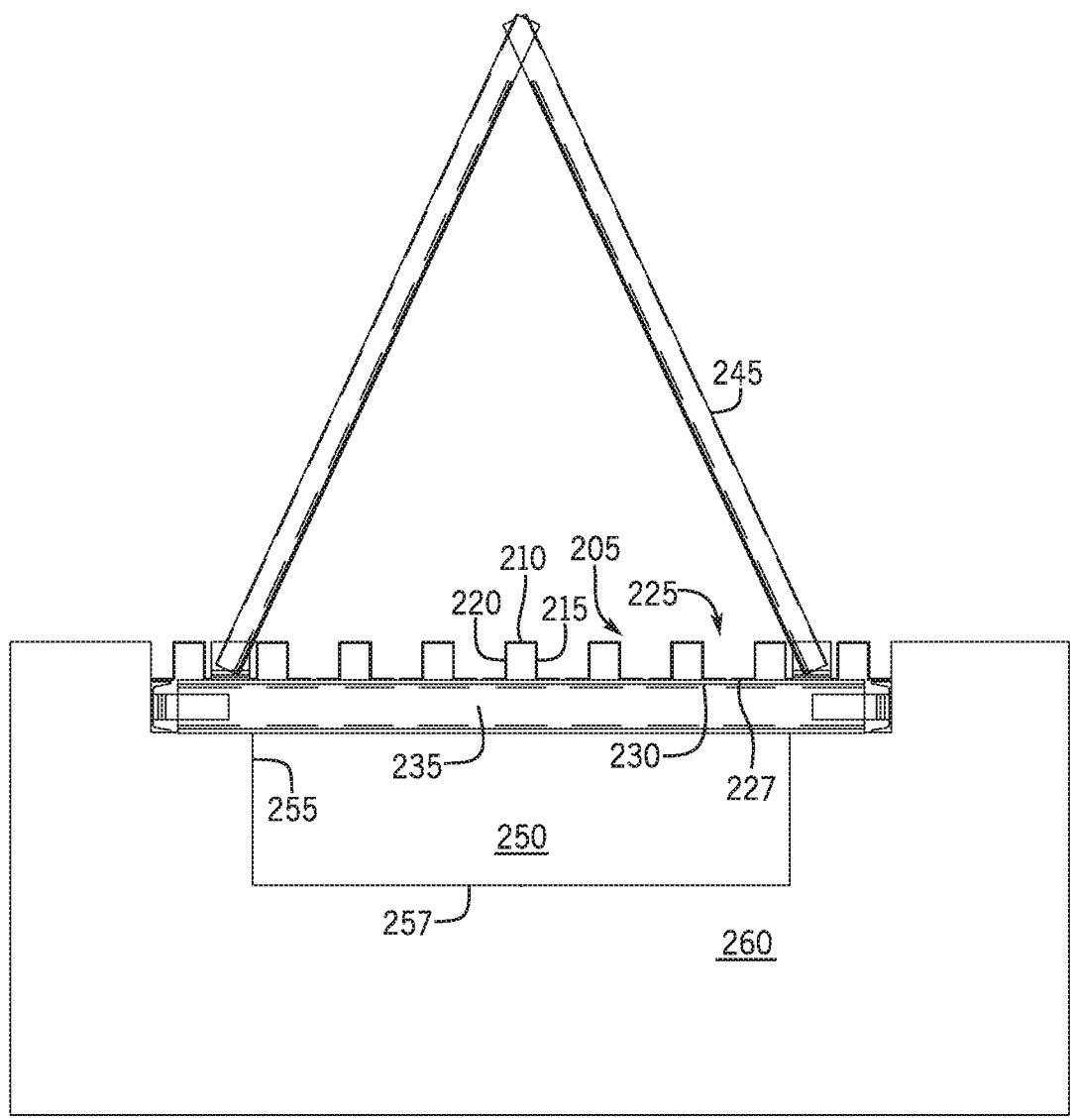
FIG. 2 shows a cross section of a stock guard according to an alternative embodiment of the invention.

FIG. 2 shows a cross section of a stock guard according to an alternative embodiment of the invention. In the embodiment of FIG. 2, the basic components of the stock guard are equivalent to those set forth above with respect to FIG. 1, but instead of support members 140 resting on the ground (and thereby translating the top, vehicle bearing of the surface up with respect to grade), in the embodiment of FIG. 2, support members 235 are installed over a ditch or cavity 250 defined by a vault 260. In particular, vault 260 includes two vertical walls 255 and a floor 257, which collectively define a ditch or cavity 250, which extends laterally and longitudinally below the linear members 205 of the stock guard. Support members 235 rest on top a shelf, also defined by vault 260, which in certain embodiments is poured concrete, such that the top surfaces 210 of linear members 205 are parallel to and flush with grade.

Figure 3:
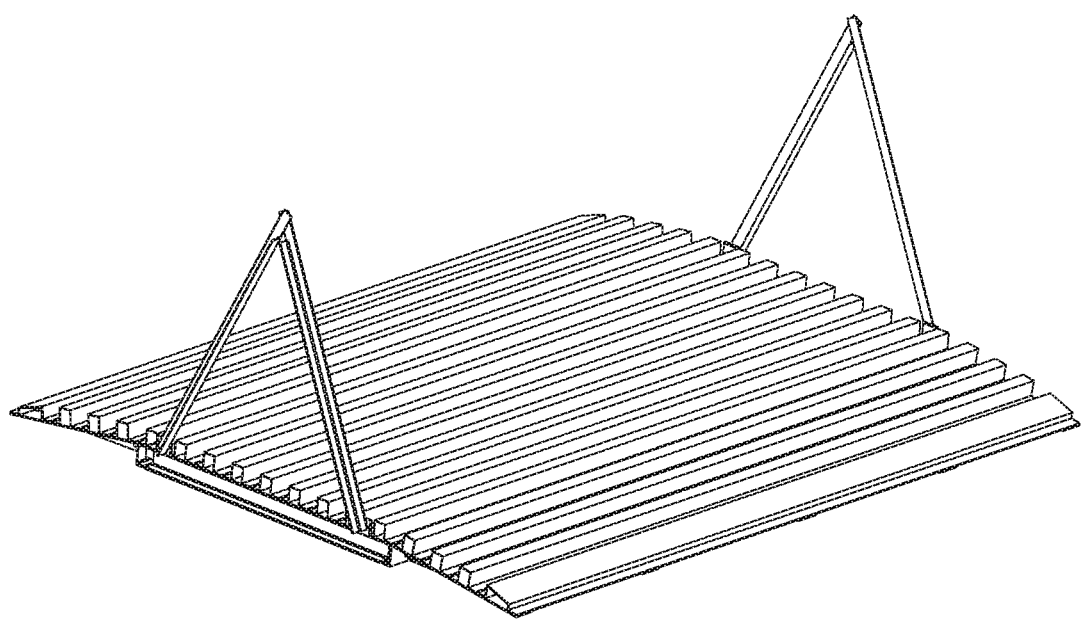
FIG. 3 is an oblique elevated view of a stock guard according to the embodiment of FIG. 1.

FIG. 3 is an oblique elevated view of a stock guard according to the embodiment of FIG. 1. As can be seen from FIG. 3, the linear hat-shaped members extend in a direction transverse to a direction of travel a distance sufficient for passage of a vehicle. In one embodiment, the linear extent of the linear members (and therefore the width of the stock guard) is 12 feet. Additionally, as can be seen, the stock guard may be installed at grade, on the ground, without the need to excavate a pit or ditch or pour a concrete vault. In these cases tapered transition zones facilitate a gradual transition for vehicles from grade, onto the surface of the stock guard, and off.

Figure 4:
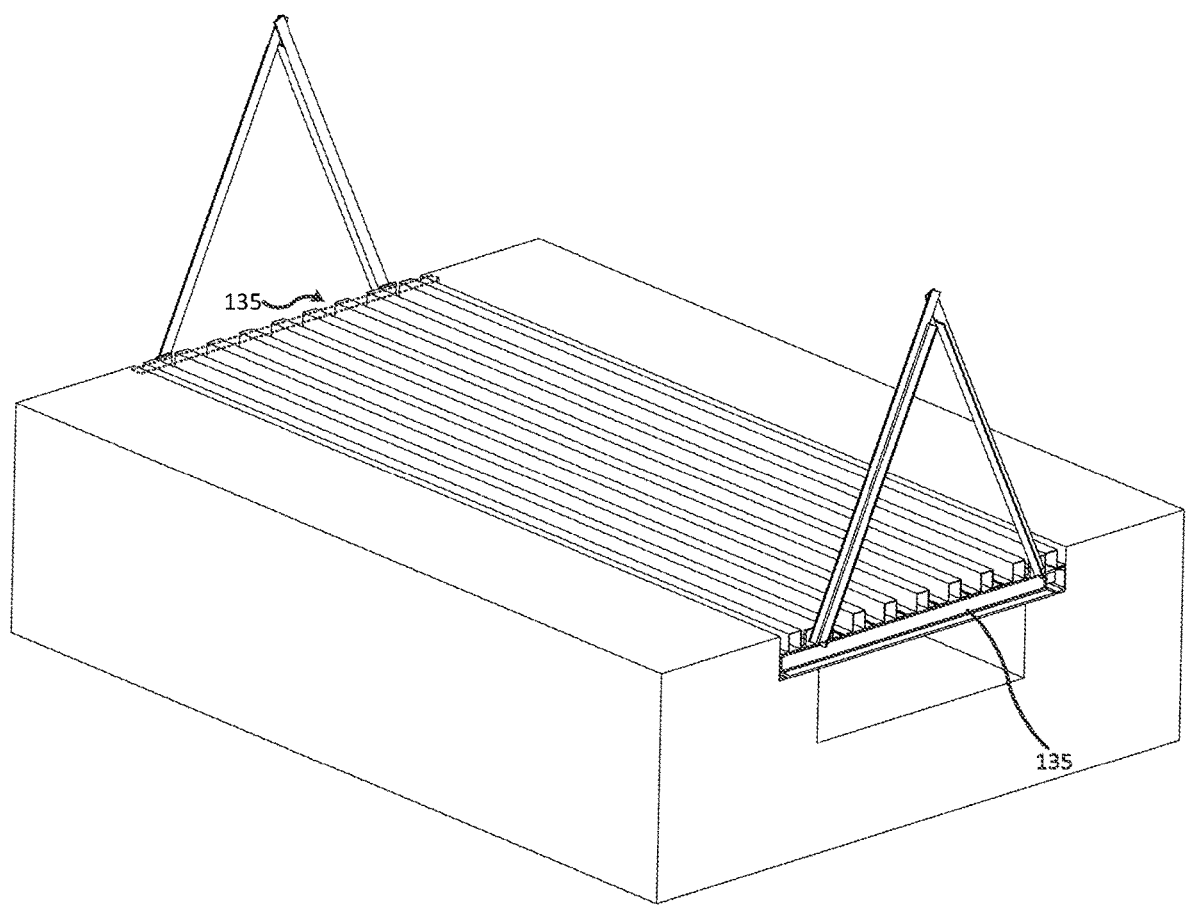
FIG. 4 is an oblique elevated view of a stock guard according to the embodiment of FIG. 2.

FIG. 4 is an oblique elevated view of a stock guard according to the embodiment of FIG. 2. As cart be seen from FIG. 4, the linear hat-shaped members extend in a direction transverse to a direction of travel a distance sufficient for passage of a vehicle. In one embodiment, the linear extent of the linear members (and therefore the width of the stock guard) is 8 feet. Additionally, as can be seen, the stock guard may be over an excavated ditch or pit defined, for example, by a poured concrete vault. In these cases tapered the top surface of the stock guard is maintained at grade.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A stock guard comprising
a plurality of mutually parallel, spaced apart linear members, each linear member having a flat, horizontal top surface, two side surfaces extending downwardly from the top surface, and two lateral flanges extending outwardly from the side surfaces such that each linear member has a hat-shaped cross section having an open bottom, each linear member having a long axis running perpendicularly to the hat-shaped cross section;
wherein, the linear members are arranged such that their flat, horizontal top surfaces lie in a plane, mutually facing side surfaces of adjacent linear members define downwardly extending pockets, and spaced apart horizontal flanges of adjacent linear members define the bottom of said pockets and define therebetween linear through slots having a long axis parallel to the long axis of the linear members, said linear through slots forming linear openings through the bottoms of said pockets.

2. The stock guard of claim 1, wherein the depth of the pockets, defined by distance from the plane containing the horizontal top surfaces and a place containing horizontal flanges of adjacent linear members is between 2 and 4 inches.

3. The stock guard of claim 1, wherein the linear members are affixed to and above a plurality of mutually parallel support members, the support members having long axes arranged perpendicularly to the long axes of the linear members.

4. The stock guard of claim 3, wherein the support members are in contact with the ground.

5. The stock guard of claim 1, wherein the lateral flanges extend horizontally from the side surfaces.

6. The stock guard of claim 5, wherein mutually facing lateral flanges of adjacent linear members are co-planar and define a lower horizontal surface of said pockets.

7. The stock guard of claim 1, wherein the spacing between mutually facing side surfaces of adjacent linear members is between 2 and 5 inches.

8. The stock guard of claim 1, further including two vehicular transition regions comprising a plurality of mutually parallel linear members, each linear member having a top surface lying in a plane sloping from a top plane of the plurality of linear members of claim 1 toward the ground.

9. The stock guard of claim 1 wherein the pockets have bottom sides that are arranged parallel to and below the top plane.

10. The stock guard of claim 9, wherein at least some of the bottom sides of the pockets are co-planar.

11. The stock guard of claim 1, wherein the pockets are linear pockets having a long axis that is parallel to the long axes of the linear members.

12. The stock guard of claim 1, wherein the linear though slots extend substantially the entire lengths of the linear members to which they are adjacent.

13. The stock guard of claim 1, further including a vault comprising at least two side walls defining a hollow trench that extends downwardly, below grade, underneath the linear members and wherein the linear though slots provide fluid communication between the pockets and the vault.

14. The stock guard of claim 1 wherein the two side surfaces extending downwardly from the top surface are substantially parallel to each other.

15. The stock guard of claim 1 wherein the linear through slots are configured to allow water to drain vertically from the pockets through the linear slots.

* * * * *